A. D. Schnackenberg,
Soda Fountain.
Nº 63,756.  Patented Apr. 9, 1867.
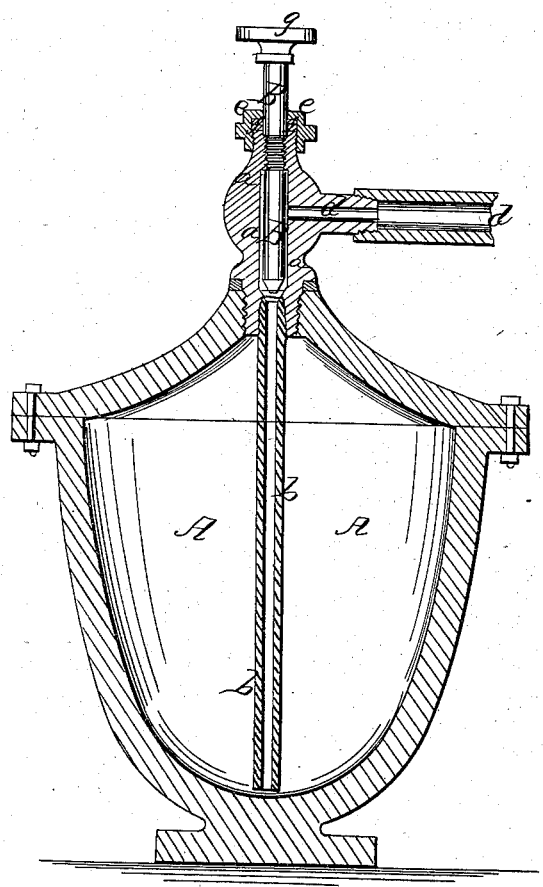
Witnesses
Theo Tusche
Alex L. Roberts
Inventor.
A. D. Schnackenberg
Per Munn & Co
Attorneys

United States Patent Office.

ARMIN D. SCHNACKENBERG, OF BROOKLYN, NEW YORK.

Letters Patent No. 63,756, dated April 9, 1867.

IMPROVED PORTABLE SODA-FOUNTAIN.

*The Schedule referred to in these Letters Patent and making part of the same.*

TO ALL WHOM IT MAY CONCERN:

Be it known that I, ARMIN D. SCHNACKENBERG, of Brooklyn, Kings county, New York, have invented a new and improved Parlor Soda-Fountain; and I do hereby declare that the following is a full, clear, and exact description thereof, which will enable others skilled in the art to make and use the same, reference being had to the accompanying drawings, forming a part of this specification.

The object of this invention is to construct a soda-fountain, especially of that class which can be used in families, in such a manner that the valve can be easily opened or closed, and that the simplest mechanism for operating the said valve be used.

In the annexed drawing, which represents a vertical sectional view of my improved fountain, my invention is fully illustrated.

A represents the reservoir, made of cast iron, or other suitable material, and lined on the inside in the usual manner. It may be made in the shape of an urn, as shown, or in any other suitable form, and consists of an upper and lower portion, as shown. To the top of the fountain is screwed the eduction pipe $a$, into the lower end of which the tube $b$ is screwed that reaches almost to the bottom of the fountain. A screw-plug, B, passes through the pipe $a$, and at its lower end is made conical or tapering, as shown, so that when screwed down the conical end will completely close the end of the tube $b$, which is prepared so as to fit the conical end of the plug, as shown. The pipe $a$ is larger in diameter than the pin B, so that when the latter is raised from the end of the tube $b$ the soda or mineral water contained in the reservoir will pass up through the space between $a$ and B and out through the discharge pipe $d$, which is attached at right angles to the pipe $a$, as shown. The upper end of the pipe $a$ is closed by a cap, $e$, and packing, $f$, is arranged between the two, as shown, to prevent the liquid from escaping around the pin B. The latter is operated by a crank or hand-wheel, $g$, on top, as shown.

It will be seen that but a small turn of the plug B will suffice to make the water escape through the discharge $d$ in a stream of sufficient thickness. The valve is not closed by leather washers, which are easily used up and of which small pieces are carried off and soil the water. The different tubes may be made of tin, or coated therewith to prevent them from oxidizing. The high-pressure tube $b$ may also, if desired, be made of hard rubber.

I claim as new, and desire to secure by Letters Patent—

Closing the end of the high-pressure tube $b$ directly with a conical plug, B, without the use of a leather or other washer or packing for the valve, all made and operating substantially as and for the purpose herein shown and described.

A. D. SCHNACKENBERG.

Witnesses:
WM. F. MCNAMARA,
A. V. BRIESEN.